(12) United States Patent
Razavi

(10) Patent No.: US 6,515,086 B1
(45) Date of Patent: Feb. 4, 2003

(54) POLYOLEFIN PRODUCTION

(75) Inventor: Abbas Razavi, Mons (BE)

(73) Assignee: Fina Research, S.A., Feluy (BE)

( * ) Notice: Subject to any disclaimer, the term of this patent is extended or adjusted under 35 U.S.C. 154(b) by 0 days.

(21) Appl. No.: 09/506,943

(22) Filed: Feb. 18, 2000

Related U.S. Application Data

(60) Provisional application No. 60/121,753, filed on Feb. 26, 1999.

(30) Foreign Application Priority Data

Feb. 19, 1999 (WO) .............................. PCT/EP99/01094

(51) Int. Cl.[7] .......................... C08F 4/642; C08F 4/643
(52) U.S. Cl. .................. 526/160; 526/127; 526/134; 526/351; 526/943; 556/53; 502/117; 502/152
(58) Field of Search ................. 526/127, 134, 526/160, 351, 943

(56) References Cited

U.S. PATENT DOCUMENTS

| | | | | |
|---|---|---|---|---|
| 5,384,298 A | * | 1/1995 | Inahara et al. ............... | 502/104 |
| 5,401,817 A | * | 3/1995 | Palackal et al. ............. | 526/127 |
| 6,316,558 B1 | * | 11/2001 | Kaneko et al. ............. | 526/133 |

FOREIGN PATENT DOCUMENTS

| | | |
|---|---|---|
| EP | 0419677 | 4/1991 |
| EP | 0487278 | 5/1992 |
| EP | 0577581 | 1/1994 |
| EP | 0748824 | 12/1996 |
| EP | 0780396 | 6/1997 |
| EP | 0824112 | 2/1998 |
| EP | 0881236 | 12/1998 |
| EP | 881236 A1 | * 12/1998 |
| EP | 881 236 A1 | * 12/1998 |

* cited by examiner

Primary Examiner—David W. Wu
Assistant Examiner—R. Rabago
(74) Attorney, Agent, or Firm—Hitt Gaines & Boisbrun

(57) ABSTRACT

A process for preparing polyolefins having a monomer length of up to C10, which comprises first contacting: (1) a metallocene catalyst component for the preparation of a polyolefin which comprises an isotactic polyolefin or syndiotactic/isotactic block polyolefin having a monomer length of up to $C_{10}$, the component having the general formula:

$$R''(CpR_1R_2R_3)(Cp'R_1'R_2')MQ_2$$

Figure 1:
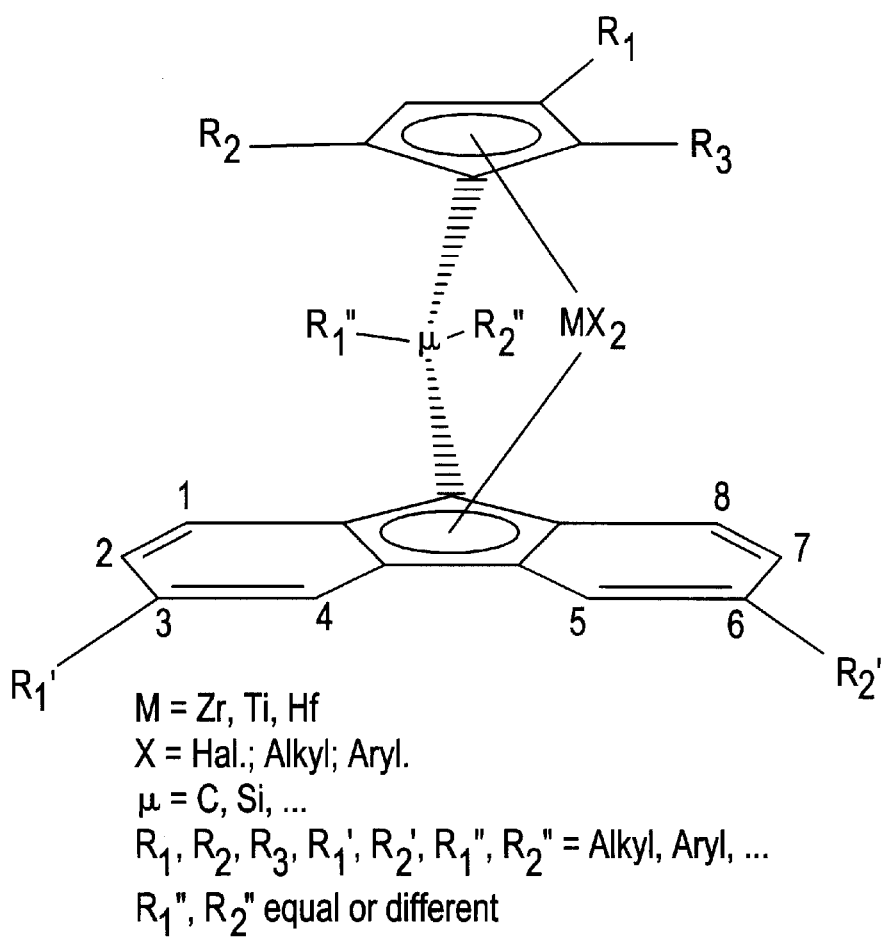
Figure 2:
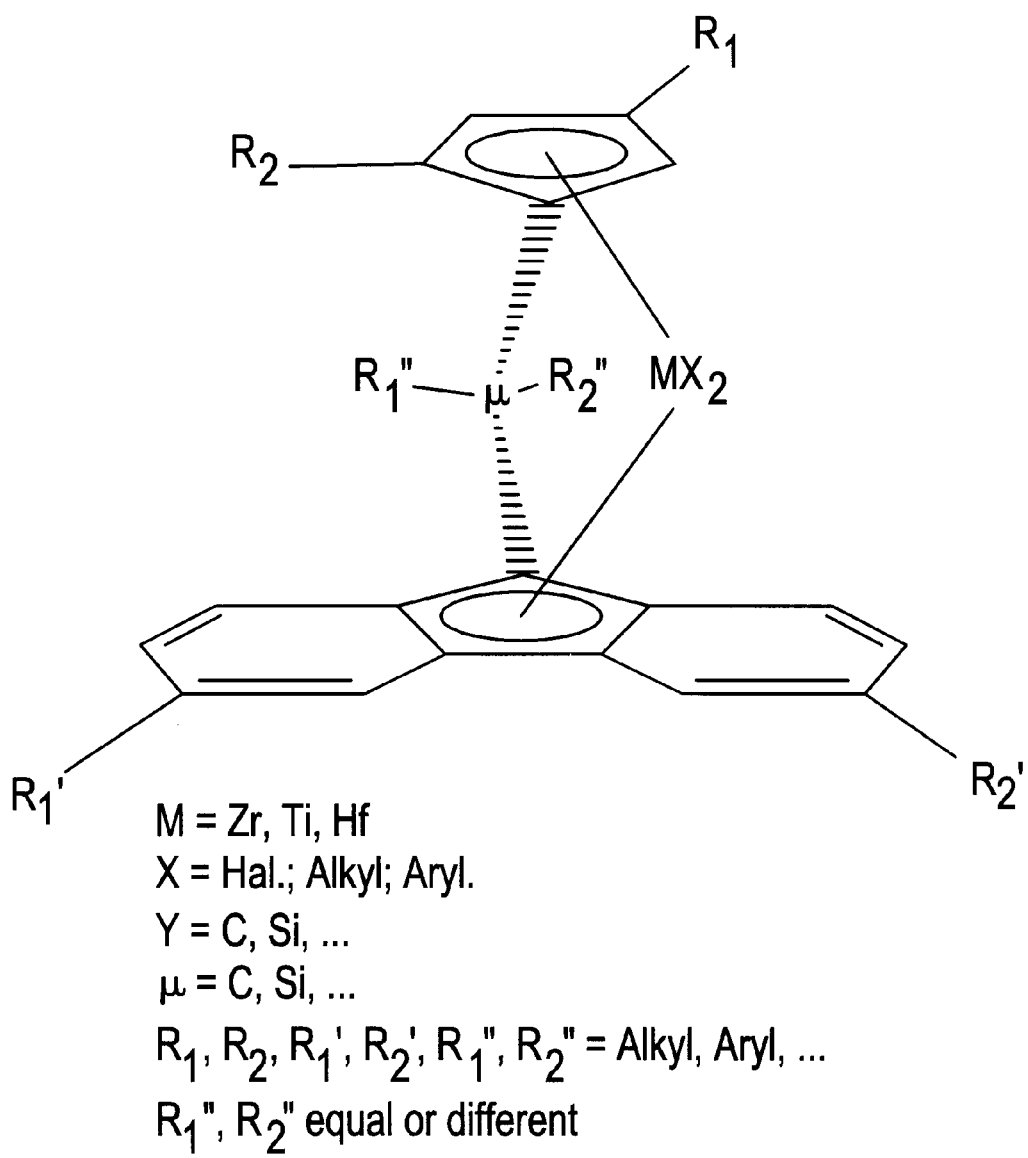
Figure 3:
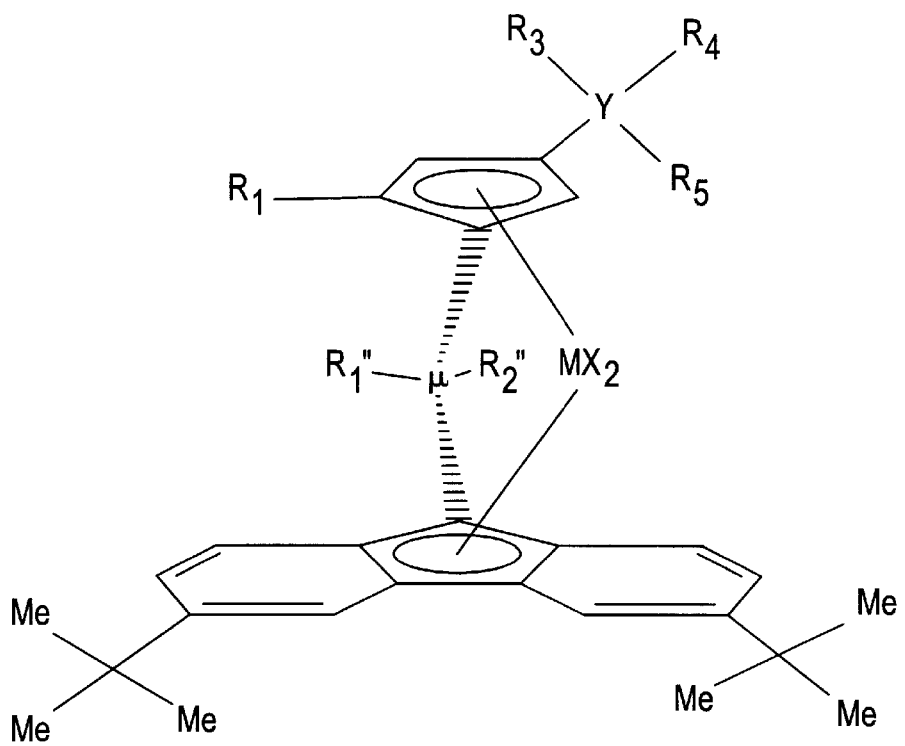
Figure 4:
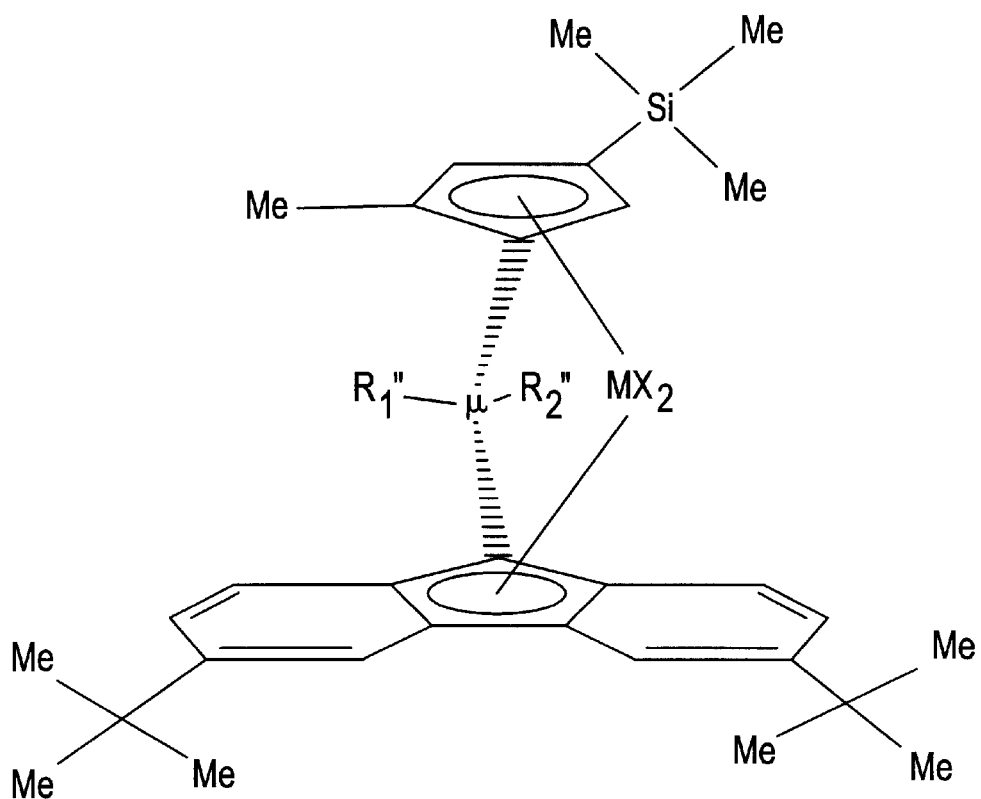
Figure 5:
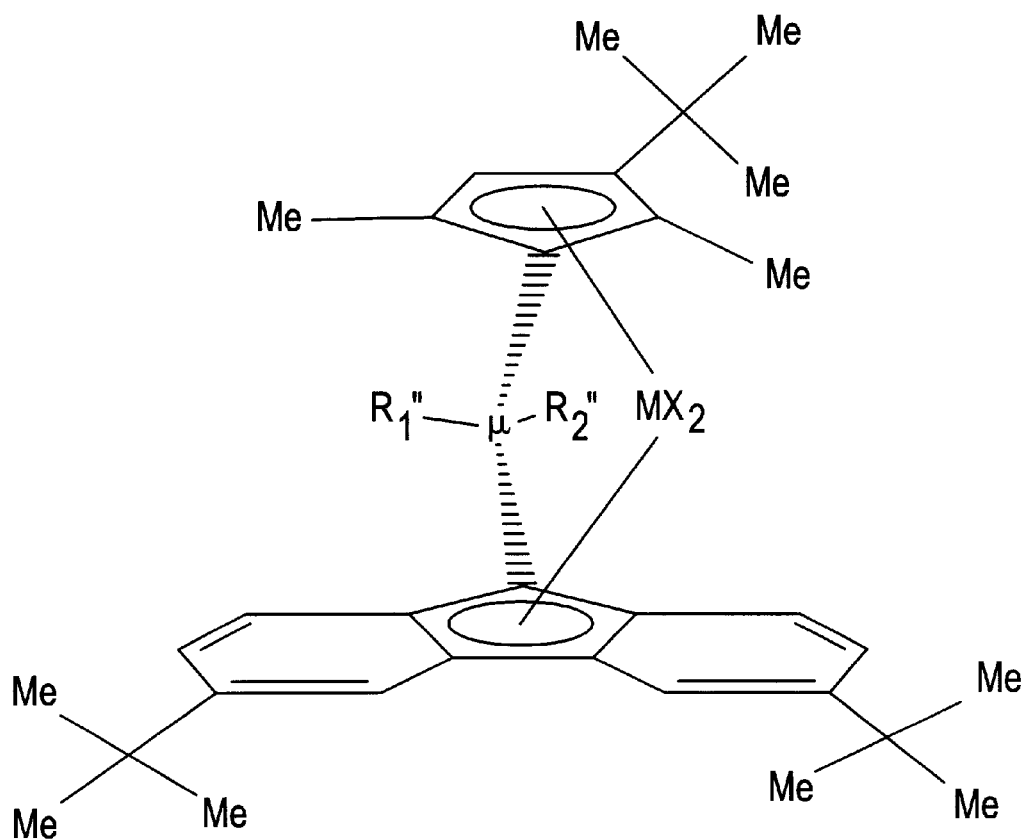
Figure 6:
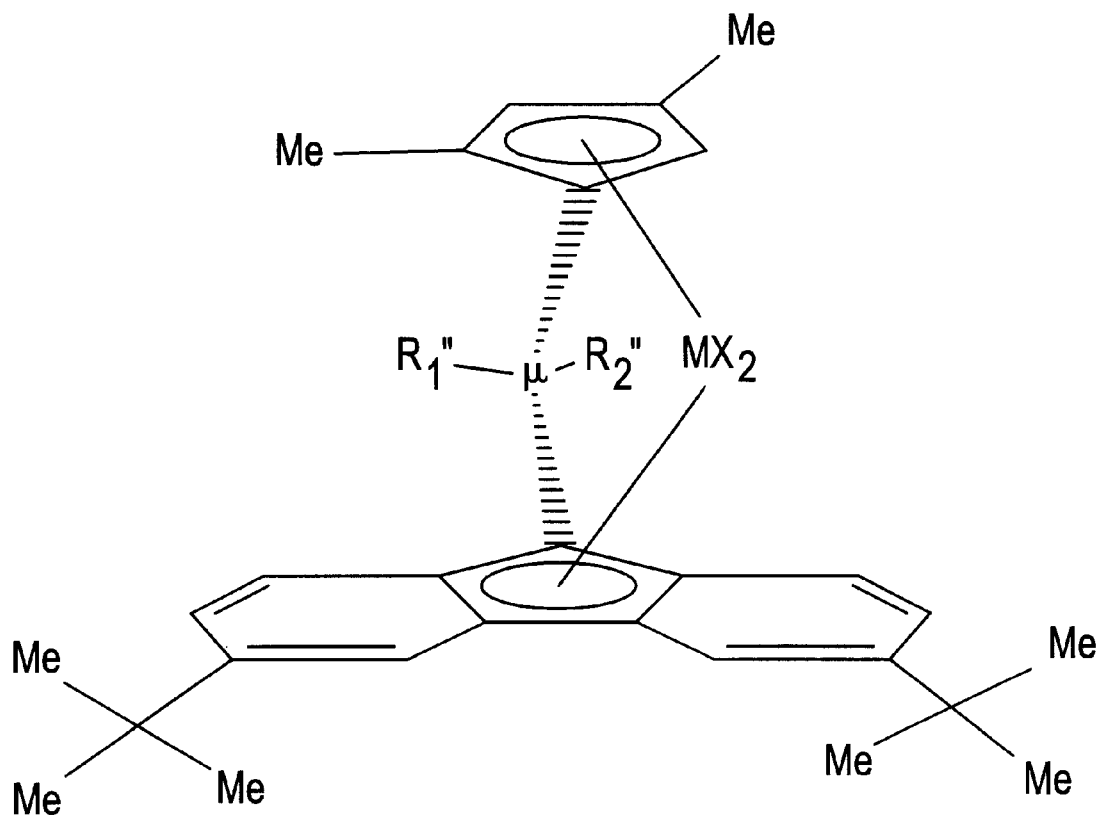
Figure 7:
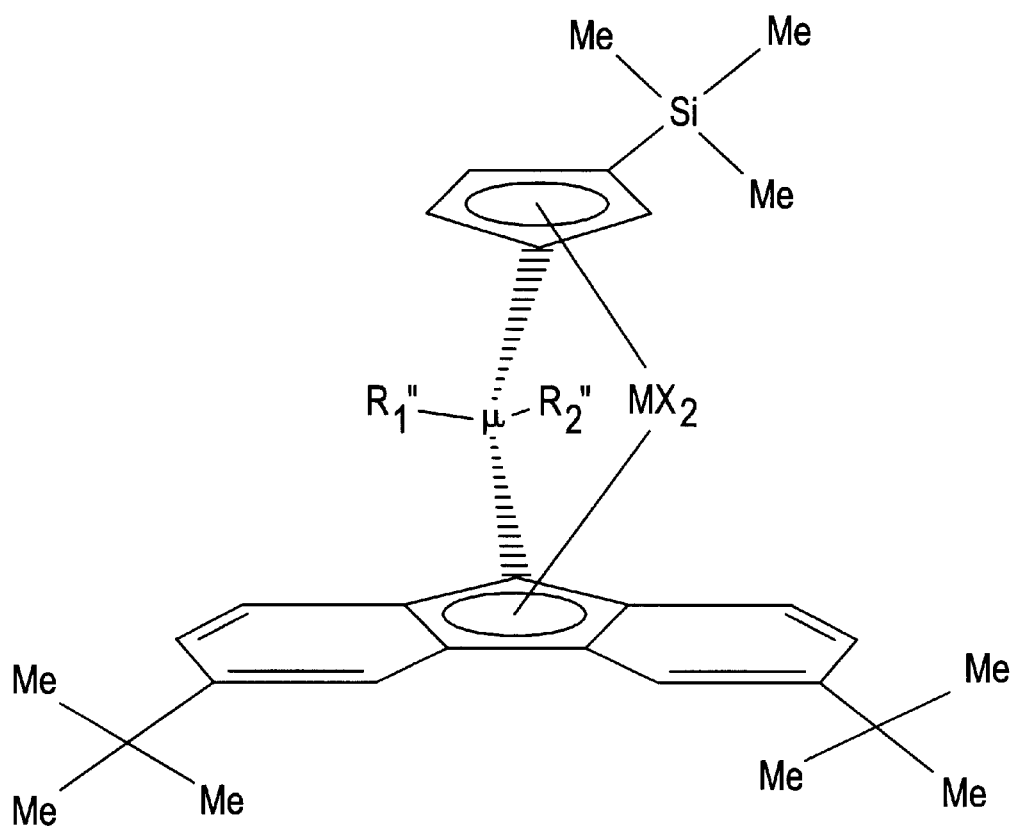
Figure 8:
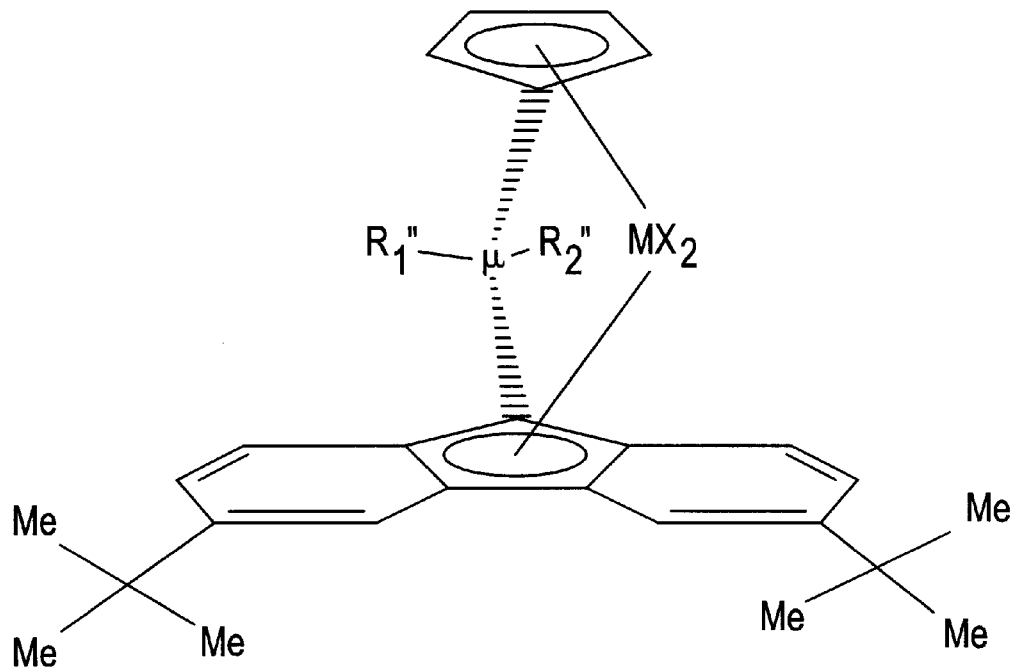
Figure 9:
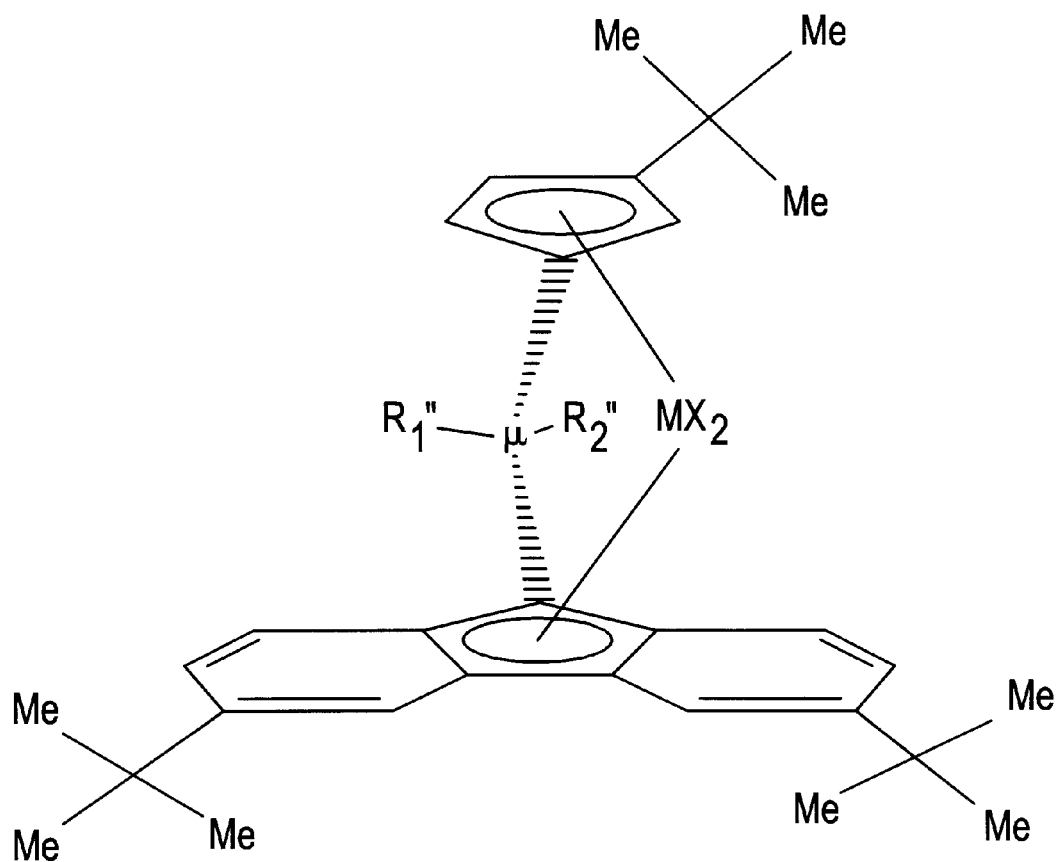
Figure 10:
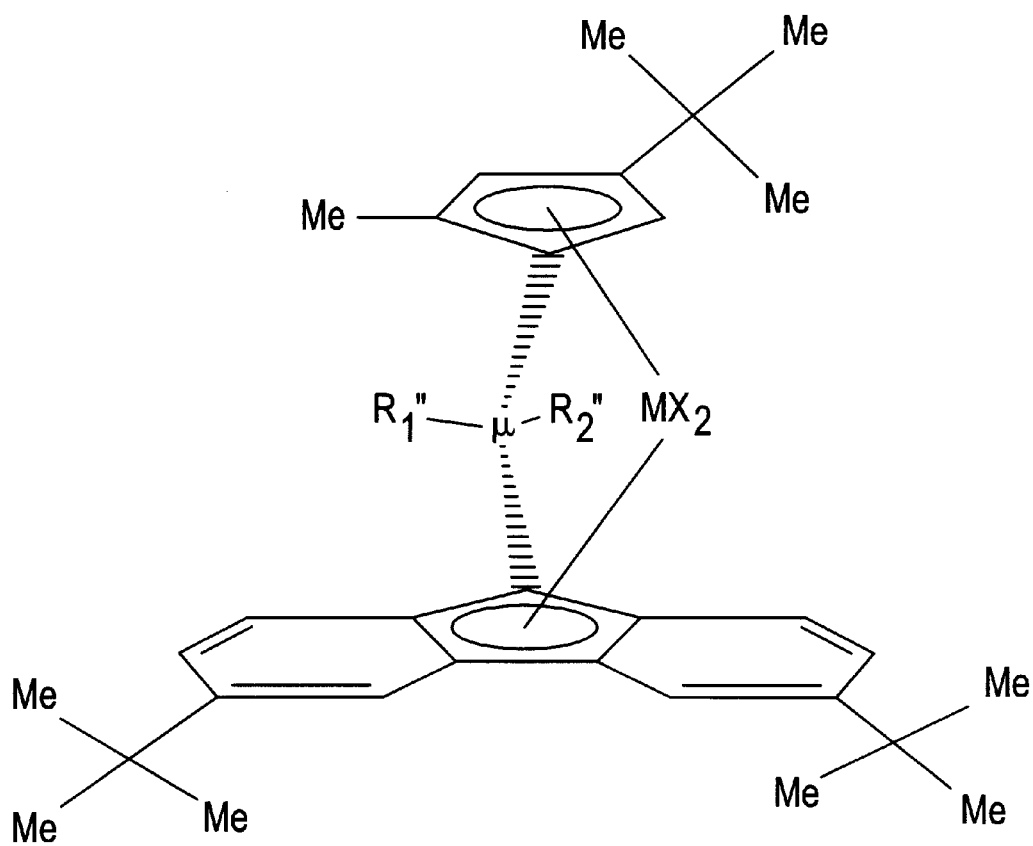
Figure 11:
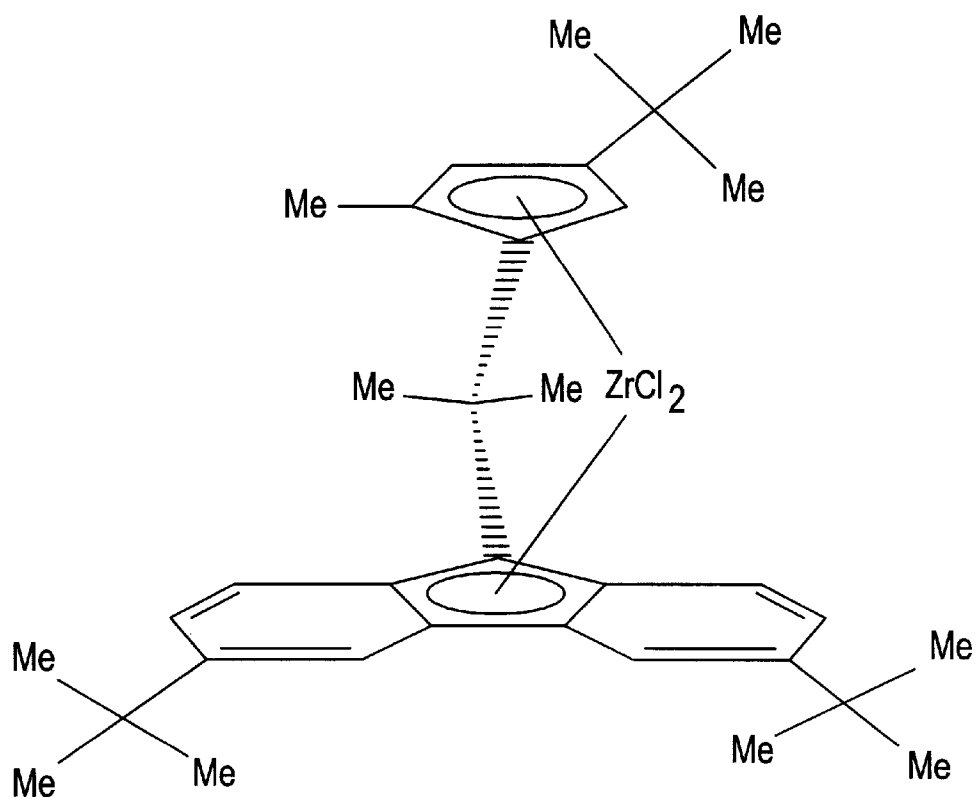
Figure 12:
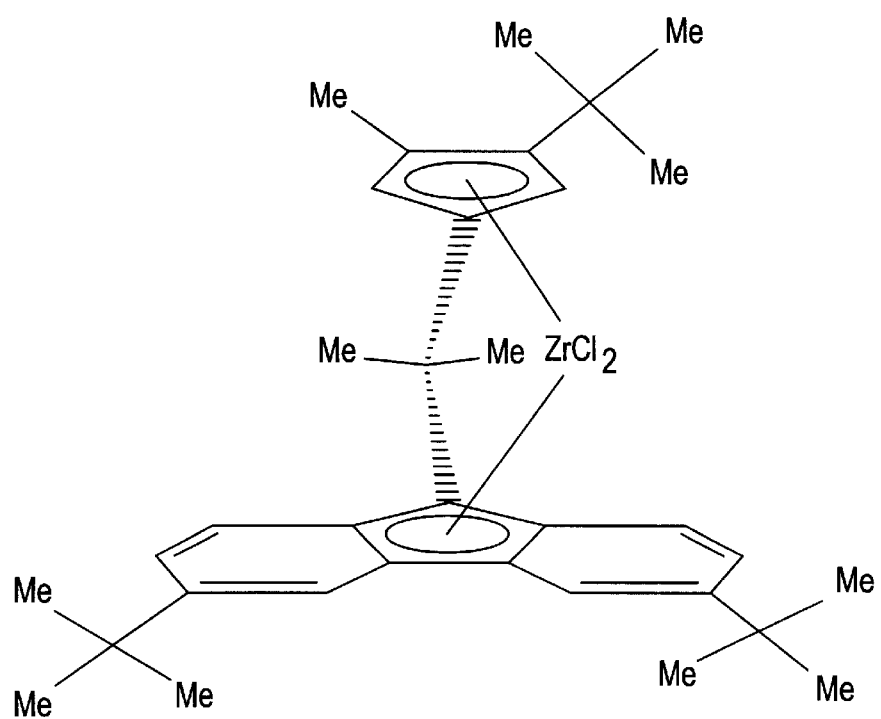

wherein Cp is a cyclopentadienyl ring substituted with at least one substituent of $R_1R_2$ and/or $R_3$; Cp' is a substituted fluorenyl ring with substituents $R_1'$ and $R_2'$; R" is a structural bridge imparting stereorigidity to the component; $R_1$ is a substituent on the cyclopentadienyl ring which is distal to the bridge; $R_2$ is a substituent on the cyclopentadienyl ring which is proximal to the bridge and positioned either non-vicinal or vicinal to the distal substituent; $R_3$ is a substituent on the cyclopentadienyl ring which is proximal to the bridge; $R_1'$ and $R_2'$ are each independently substituent groups on the fluorenyl ring; M is a Group IVB transition metal or vanadium; and each Q is hydrocarbyl, and (2) an aluminum- or boron-containing co-catalyst capable of activating the catalyst component. Second, contacting the activated catalyst with at least one olefin in a reaction zone under polymerization conditions to form an isotactic polyolefin or a syndiotactic/isotactic block polyolefin.

25 Claims, 13 Drawing Sheets

M = Zr, Ti, Hf
X = Hal.; Alkyl; Aryl.
Y = C, Si, ...
μ = C, Si, ...
$R_1, R_2, R_1', R_2', R_1'', R_2''$ = Alkyl, Aryl, ...
$R_1'', R_2''$ equal or different M = Zr, Ti, Hf
X = Hal.; Alkyl; Aryl.
Y = C, Si, ...
µ = C, Si, ...

$R_1$, $R_1''$, $R_2''$, $R_3$, $R_4$, $R_5$ = Alkyl, Aryl, ...
$R_1''$, $R_2''$ equal or different M = Zr, Ti, Hf
X = Hal.; Alkyl; Aryl.
μ = C, Si, ...
$R_1''$, $R_2''$ = Alkyl, Aryl, ...
$R_1''$, $R_2''$ equal or different M = Zr, Ti, Hf
X = Hal.; Alkyl; Aryl.
μ = C, Si, ...
$R_1''$, $R_2''$ = Alkyl, Aryl, ...
$R_1''$, $R_2''$ equal or different M = Zr, Ti, Hf
X = Hal.; Alkyl; Aryl.
μ = C, Si, ...
$R_1''$, $R_2''$ = Alkyl, Aryl, ...
$R_1''$, $R_2''$ equal or different M = Zr, Ti, Hf
X = Hal.; Alkyl; Aryl.
μ = C, Si, ...
$R_1''$, $R_2''$ = Alkyl, Aryl, ...
$R_1''$, $R_2''$ equal or different M = Zr, Ti, Hf
X = Hal.; Alkyl; Aryl.
μ = C, Si, ...
$R_1"$, $R_2"$ = Alkyl, Aryl, ...
$R_1"$, $R_2"$ equal or different M = Zr, Ti, Hf
X = Hal.; Alkyl; Aryl.
μ = C, Si, ...
$R_1"$, $R_2"$ = Alkyl, Aryl, ...
$R_1"$, $R_2"$ equal or different M = Zr, Ti, Hf
X = Hal.; Alkyl; Aryl.
µ = C, Si, ...
R$_1$", R$_2$" = Alkyl, Aryl, ...
R$_1$", R$_2$" equal or different

POLYOLEFIN PRODUCTION

This application claims the benefit of U.S. Provisional Application No. 60/121,753, filed Feb. 26, 1999.

FIELD OF THE INVENTION

The present invention relates to a metallocene catalyst component for use in preparing polyolefins, especially polypropylenes. The invention further relates to a catalyst system which incorporates the metallocene catalyst component and a process for preparing such polyolefins.

BACKGROUND TO THE INVENTION

Olefins having 3 or more carbon atoms can be polymerised to produce a polymer with an isotactic stereochemical configuration. For example, in the polymerisation of propylene to form polypropylene, the isotactic structure is typically described as having methyl groups attached to the tertiary carbon atoms of successive monomeric units on the same side of a hypothetical plane through the main chain of the polymer. This can be described using the Fischer projection formula as follows:

Another way of describing the structure is through the use of NMR spectroscopy. Bovey's NMR nomenclature for an isotactic pentad is . . . mmmm with each "m" representing a "meso" diad or successive methyl groups on the same side in the plane.

In contrast to the isotactic structure, syndiotactic polymers are those in which the methyl groups attached to the tertiary carbon atoms of successive monomeric units in the chain lie on alternate sides of the plane of the polymer. Using the Fischer projection formula, the structure of a syndiotactic polymer is described as follows:

In NMR nomenclature, a syndiotactic pentad is described as . . . rrrr . . . in which "r" represents a "racemic" diad with successive methyl groups on alternate sides of the plane.

In contrast to isotactic and syndiotactic polymers, an atactic polymer exhibits no regular order of repeating unit. Unlike syndiotactic or isotactic polymers, an atactic polymer is not crystalline and forms essentially a waxy product.

While it is possible for a catalyst to produce all three types of polymer, it is desirable for a catalyst to produce predominantly an isotactic or syndiotactic polymer with very little atactic polymer. C2-symmetric metallocene catalysts are known in the production of the polyolefins. For example, C2 symmetric bis indenyl type zirconocenes which can produce high molecular weight high melting isotactic polypropylene. The preparation of this metallocene catalyst is costly and time-consuming, however. Most importantly, the final catalyst consists of a mixture of racemic and meso isomers in an often unfavourable ratio. The meso stereoisomer has to be separated to avoid the formation of atactic polypropylene during the polymerisation reaction.

EP-A-0426644 relates to syndiotactic copolymers of olefins such as propylene obtainable using as a catalyst component isopropyl (fluorenyl)(cyclopentadienyl) zirconium dichloride. Syndiotacticity, as measured by the amount of syndiotactic pentads, rrrr was found to be 73–80%.

EP 747406 relates to the polymerisation of an olefin monomer to form a syndiotactic/isotactic block polyolefin, particularly a block polypropylene. A component of the polymerisation catalyst was a 3-trimethylsilyl cyclopentadienyl-9-fluorenyl zirconium or hafnium dichloride having an isopropylidene or diphenylmethylidene bridge.

EP-A-0537130 discloses the use of a C1 symmetric metallocene catalysts for the production of isotactic polypropylene. A preferred catalyst is isopropylidine (3-tert butyl-cyclopentadienyl-fluorenyl) ZrCl2. This catalyst has a bulky t-butyl group positioned on the cyclopentadienyl ring distal to the isopropylidine bridge. This catalyst has the advantage that it consists of only one stereoisomer and so no isomeric metallocene separation is required at the final stage of its synthesis. Whilst polypropylene preparation using this catalyst produces isotactic polypropylene, the polymer product has poor mechanical properties because of the presence of regiodefects and relatively low molecular weight.

Regiodefects occur in the polymer chain when, instead of producing a perfect isotactic polyolefin in which each monomeric unit is positioned head-to-tail in relation to the next, mis-insertions of the monomers occur so as to give either a head-to-head or tail-to-tail mis-match. These so called (2-1) regiodefects are partially transferred to the so called (1-3) insertion through an isomerisation process leaving units of four CH2 groups in the backbone of the polypropylene chain. This has a deleterious effect on the physical and mechanical properties of the polymer and results in low molecular weight isotactic polypropylene with a low melting point. EP-A-0881236 addresses this problem by providing isopropylidene (5-methyl-3t-butyl cyclopentadienyl fluorene) zirconium dichloride as part of a polymerisation catalyst. However, polypropylenes obtained using this catalyst have molecular weights (Mw) in the range 213900 to 458500 and a microtacticity characterised by the mmmm pentad in the range 82.8% to 86.8%. The melting temperature of these polymers is in the range 139.3 to 143.8.

EP-A-577581 discloses the production of syndiotactic polypropylenes using metallocene catalysts which have fluorenyl groups substituted in positions 2 and 7 and an unsubstituted cyclopentadienyl ring. The production of isotactic or syndiotactic/isotactic block polyolefins using these metallocene catalysts is not disclosed.

EP-A-0748824 describes the use of a chiral transition metal compound and an aluminoxane to produce stereoregular isotactic polypropylenes with a reported isotactic pentad content of up to 0.972. No data are presented in relation to the amount of monomer misinsertions in the polypropylene.

SUMMARY OF THE INVENTION

The present invention aims to overcome the disadvantages of the prior art.

In a first aspect, the present invention provides use of a metallocene catalyst component for the preparation of a polyolefin which comprises an isotactic or polyolefin syndiotactic/isotactic block polyolefin having a monomer length of up to C10, which component has the general formula:

$$R''(C_pR_1R_2R_3)(C_p'R_1'R_2')MQ_2 \qquad (I)$$

wherein $C_p$ is a cyclopentadienyl ring substituted with at least one substituent; $C_p'$ is a substituted fluorenyl ring; $R''$ is a structural bridge imparting stereorigidity to the component; $R_1$ is optionally a substituent on the cyclopentadienyl ring which is distal to the bridge, which distal substituent comprises a bulky group of the formula $XR^*_3$ in which X is chosen from Group IVA, and each $R^*$ is the same or different and chosen from hydrogen or hydrocarbyl of from 1 to 20 carbon atoms, $R_2$ is optionally a substituent on the cyclopentadienyl ring which is proximal to the bridge and positioned non-vicinal to the distal substituent and is of the formula $YR\#_3$ in which Y is chosen from group IVA, and each R# is the same or different and chosen from hydrogen or hydrocarbyl of 1 to 7 carbon atoms, $R_3$ is optionally a substituent on the cyclopentadienyl ring which is proximal to the bridge and is a hydrogen atom or is of the formula $ZR\$_3$, in which Z is chosen from group IVA, and each R$ is the same or different and chosen from hydrogen or hydrocarbyl of 1 to 7 carbon atoms, $R_1'$ and $R_2'$ are each independently substituent groups on the fluorenyl ring, one of which is a group of the formula $AR'''_3$, in which A is chosen from Group IVA, and each R''' is independently hydrogen or a hydrocarbyl having 1 to 20 carbon atoms and the other is hydrogen or a second group of the formula $AR'''_3$; M is a Group IVB transition metal or vanadium; and each Q is hydrocarbyl having 1 to 20 carbon atoms or is a halogen.

Polyolefins produced using the metallocene catalyst component of the present invention are surprisingly found to have very good microtacticity, especially as determined by pentad distribution levels in 13C nmr. The polyolefins are also found to be substantially free of regiodefects. Accordingly, the polyolefins produced thereby have improved mechanical properties including a high weight average molecular weight typically in excess of 500,000 and melting point elevated by at least 10° C. as compared with prior art values.

The applicants have unexpectedly found that if in the metallocene catalysts the fluorenyl ring is substituted in certain specific positions, preferably in position 3 and/or 6, there is a significant improvement in the tacticity of the produced polymer, and a dramatic drop in the regio-defects of said polymer.

According to the present invention, the fluorenyl ring may be substituted by radicals of general formula: AR'''3 where A is preferably carbon or silicon and is more preferably carbon. Where A is carbon, AR''' may be a hydrocarbyl selected from alkyl, aryl, alkenyl, alkyl aryl or aryl alkyl, such as methyl, ethyl, propyl, isopropyl, butyl, isobutyl, amyl, isoamyl, hexyl, heptyl, octyl, nonyl, decyl, cetyl or phenyl. Where A is silicon, AR'''3 may be Si(CH3)3. Preferably at least one of R'1 and R'2 is t-butyl. More preferably both R'1 and R'2 are the same.

In addition, the applicants have also found that when catalysts of the invention are used to produce polypropylene, they show melting points generally higher than 150° C. and which may even reach 165° C. which is a considerable improvement over the prior art.

The structural bridge R" is preferably alkylidene having 1 to 20 aliphatic or aromatic carbon atoms, a dialkyl germanium or silicon or siloxane, alkyl phosphene or amine bridging the two Cp rings. R" is preferably isopropylidene in which the two Cp rings are bridged at position 2 of the isopropylidene. Alternatively, R" is diphenylmethylidene.

M is preferably zirconium or titanium, most preferably zironium. Q may be a hydrocarbyl such as alkyl, aryl, alkenyl, alkylaryl or aryl alkyl, preferably methyl, ethyl, propyl, isopropyl, butyl, isobutyl, amyl, isoamyl, hexyl, heptyl, octyl, nonyl, decyl, cetyl or phenyl. Q is preferably a halogen.

The selection of the substitution pattern on the cyclopentadienyl ring depends on the desired stereochemistry of the polyolefin product. The metallocene catalyst component of the present invention may be used to produce isotactic polyolefins or syndiotactic/isotactic block polyolefins. The polyolefins can be homopolymers or copolymers. Where a syndiotactic/isotactic polyolefin is required, it is preferred that the cyclopentadienyl ring is substituted at a position distal to the bridge. R1 is therefore not hydrogen but is instead a substituent on the cyclopentadienyl ring. It is preferred that R1 is a bulky distal substituent group.

In the bulky distal substituent group R1, X is preferably C or Si. R* may be a hydrocarbyl such as alkyl, aryl, alkenyl, alkylaryl or aryl alkyl, preferably methyl, ethyl, propyl, isopropyl, butyl, isobutyl, amyl, isoamyl, hexyl, heptyl, octyl, nonyl, decyl, cetyl or phenyl. R1 may comprise a hydrocarbyl which is attached to a single carbon atom in the cyclopentadienyl ring or may be bonded to two carbon atoms in that ring. Preferably, R1 is C(CH3)3, C(CH3)2Ph, CPh3 or Si(CH3)3, most preferably C(CH3)3.

Where an isotactic polyolefin is required, it is preferred that both R1 and R2 are not hydrogen. R2 is a substituent on the cyclopentadienyl ring which is proximal to the bridge and preferably comprises a CH3 group.

The cyclopentadienyl ring may also be substituted by R3 in isotactic polyolefin production. R3 is preferably CH3.

In a further aspect, the metallocene catalyst component for use in preparing polyolefins comprises (i) a catalyst component as defined above; and (ii) a regioisomer thereof in which R2 is proximal to the bridge and positioned vicinal to the distal substituent.

Such regioisomers are frequently relatively easy to prepare because they are formed as a "by-product" during the synthetic route by which the catalyst component (i) may be made.

Surprisingly, it has been found that catalyst components including both regioisomers can be used in the preparation of polyolefins which have a multimodal, especially a bimodal, molecular weight distribution.

In a further aspect, a catalyst system is used for preparing the polyolefins, which system comprises (a) a catalyst component as defined above; and (b) an aluminium- or boron-containing cocatalyst capable of activating the catalyst component. Suitable aluminium-containing cocatalysts comprise an alumoxane, an alkyl aluminium and/or a Lewis acid.

The alumoxanes usable in the process of the present invention are well known and preferably comprise oligomeric linear and/or cyclic alkyl alumoxanes represented by the formula:

(I)

for oligomeric, linear alumoxanes and

(II)

for oligomeric, cyclic alumoxane,
wherein n is 1–40, preferably 10–20, m is 3–40, preferably 3–20 and R is a C1–C8 alkyl group and preferably methyl. Generally, in the preparation of alumoxanes from, for example, aluminium trimethyl and water, a mixture of linear and cyclic compounds is obtained.

Suitable boron-containing cocatalysts may comprise a triphenylcarbenium boronate such as tetrakis-pentafluorophenyl-borato-triphenylcarbenium as described in EP-A-0427696, or those of the general formula [L'—H]+[B Ar1 Ar2 X3 X4]— as described in EP-A-0277004 (page 6, line 30 to page 7, line 7).

The catalyst system may be employed in a solution polymerisation process, which is homogeneous, or a slurry process, which is heterogeneous. In a solution process, typical solvents include hydrocarbons with 4 to 7 carbon atoms such as heptane, toluene or cyclohexane. In a slurry process it is necessary to immobilise the catalyst system on an inert support, particularly a porous solid support such as talc, inorganic oxides and resinous support materials such as polyolefin. Preferably, the support material is an inorganic oxide in its finally divided form.

Suitable inorganic oxide materials which are desirably employed in accordance with this invention include Group 2a, 3a, 4a or 4b metal oxides such as silica, alumina and mixtures thereof. Other inorganic oxides that may be employed either alone or in combination with the silica, or alumina are magnesia, titania, zirconia, and the like. Other suitable support materials, however, can be employed, for example, finely divided functionalized polyolefins such as finely divided polyethylene.

Preferably, the support is a silica having a surface area comprised between 200 and 700 m2/g and a pore volume comprised between 0.5 and 3 ml/g.

The amount of alumoxane and metallocenes usefully employed in the preparation of the solid support catalyst can vary over a wide range. Preferably the aluminium to transition metal mole ratio is in the range between 1:1 and 100:1, preferably in the range 5:1 and 50:1.

The order of addition of the metallocenes and alumoxane to the support material can vary. In accordance with a preferred embodiment of the present invention alumoxane dissolved in a suitable inert hydrocarbon solvent is added to the support material slurried in the same or other suitable hydrocarbon liquid and thereafter a mixture of the metallocene catalyst component is added to the slurry.

Preferred solvents include mineral oils and the various hydrocarbons which are liquid at reaction temperature and which do not react with the individual ingredients. Illustrative examples of the useful solvents include the alkanes such as pentane, iso-pentane, hexane, heptane, octane and nonane; cycloalkanes such as cyclopentane and cyclohexane, and aromatics such as benzene, toluene, ethylbenzene and diethylbenzene.

Preferably the support material is slurried in toluene and the metallocene and alumoxane are dissolved in toluene prior to addition to the support material.

In a further aspect, the present invention provides use of a catalyst component as defined above and a cocatalyst which activates the catalyst component, for the preparation of polyolefins, preferably polypropylenes. Although the present invention is dedicated to the use of metallocene catalysts, the fluorenyl ring of which has preferably been substituted in positions 3 and/or 6, it has been noted that by using a metallocene catalyst component comprising (i) the catalyic component and (ii) a regioisomer thereof, in which R2 is proximal to the bridge and positioned vicinal to the distal substituent, for the preparation of polyolefins, especially polypropylenes, having a multimodal molecular weight distribution, preferably a bimodal molecular weight distribution.

In a further aspect, the present invention provides a process for preparing polyolefins, especially polypropylenes, which comprises contacting a catalyst system as defined above with at least one olefin, preferably propylene, in a reaction zone under polymerisation conditions.

The catalyst component may be prepared by any suitable method known in the art. Generally, the preparation of the catalyst component comprises forming and isolating bridged dicyclopentadiene, which is then reacted with a halogenated metal to form the bridged metallocene catalyst.

In one embodiment, the process for preparing the bridged metallocene catalyst components comprises contacting the cyclopentadiene with a substituted fluorene under reaction conditions sufficient to produce a bridged dicyclopentadiene. The process further comprises contacting the bridged substituted dicyclopentadiene with a metal compound of the formula MQk as defined above under reaction conditions sufficient to complex the bridged dicyclopentadiene to produce a bridged metallocene wherein M and Q are each defined as above and $0 \leq k \leq 4$. The process step of contacting the bridged substituted dicyclopentadiene with a metal compound can be performed in a chlorinated solvent.

In a further embodiment, the process comprises contacting the cyclopentadiene with an alkyl silyl chloride of the formula R~2 Si Hal2 wherein R~ is a hydrocarbyl having 1 to 20 carbon atoms and Hal is a halogen. A second equivalent of a substituted fluorene is added to produce a silicon bridged cyclopentadienyl-substituent fluorenyl ligand. The subsequent steps are similar to those above for producing a bridged substituted cyclopentadienyl-fluorenyl ligand coordinated to metals such as Zr, Hf and Ti.

In a further embodiment, the process comprises contacting the substituted cyclopentadiene with a fulvene producing agent such as acetone to produce a substituted fulvene. Subsequently, in a second step, the fulvene is reacted with a fluorene substituted in position 3 and/or 6, and preferably both 3 and 6, to produce a carbon bridged substituted. cyclopentadienyl-fluorenyl ligand that will produce the desired metallocene catalysts after reacting with MC14, in which M is Zr, Hf or Ti.

In a further aspect, the present invention provides an isotactic polyolefin having a monomer length of up to C10 and a pentad distribution comprising greater than 80% and preferably at least 87% mmmm as measured by 13C nmr. The pentad distribution preferably comprises at least 90%, more preferably at least 95% mmmm as measured by 13C nmr. Preferably, the amount 2-1 and 1-3 monomer insertions in the polyolefin is less than 0.5%, more preferably, less than 0.2 and most preferably undetectable typically as measured by 13C nmr.

Figure 13:
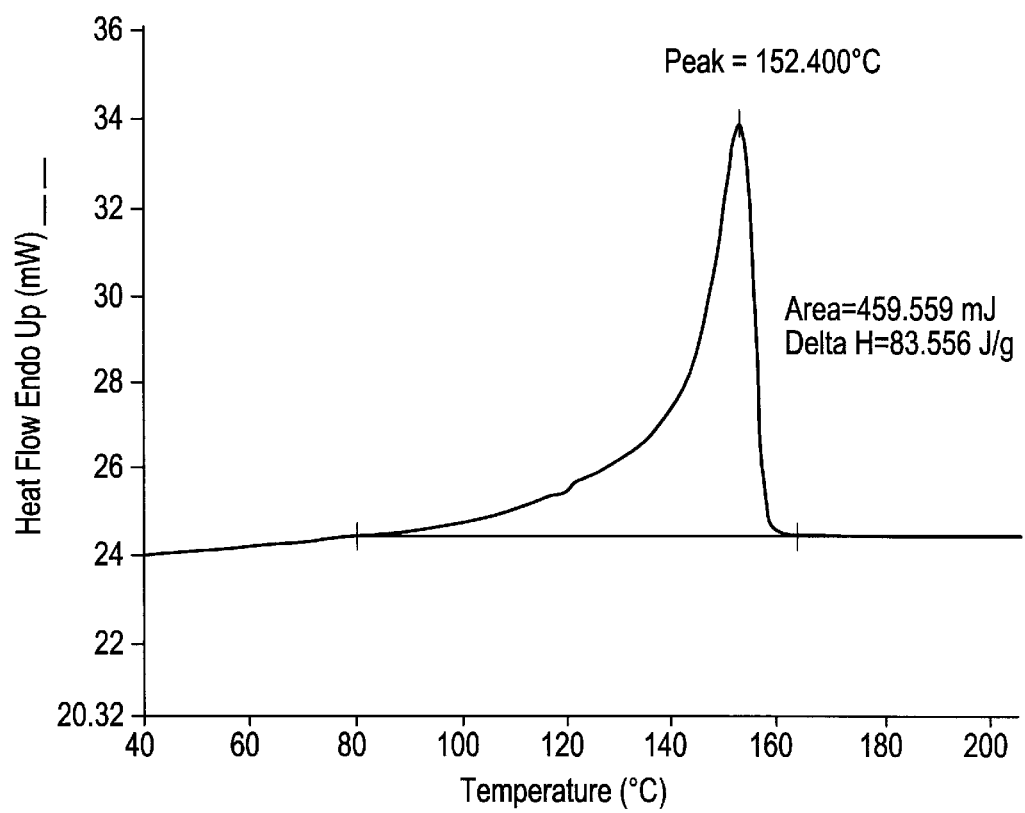

The invention will now be described in further detail, by way of example only, with reference to the attached drawings in which:

FIGS. 1 to 12 show illustrations of the structures of preferred catalyst components of the present invention; and FIG. 13 shows the results of differential scanning calorimetry analysis on isotactic polypropylene produced at 40° C. using the catalyst shown in FIG. 1.

EXAMPLE 1

Preparation of Isopropylidene [(3-tertButyl-5-methyl-cyclopentadienyl)-(3,6-di-tertbutyl-fluorenyl)]zirconium Dichloride

A. Preparation of 3,6,6-Trimethylfulvene

Reaction

Me-Cp + Acetone $\xrightarrow[\text{Pyrolidene}]{\text{Methanol}}$ 3,6,6-Me3-Ful Procedure In a round bottom flask equipped with magnetic stirring bar and N2 inlet is placed 350 ml of methanol (at −78° C.) containing freshly prepared methylcyclopentadiene under N2. To this solution is added a solution of 28.6 g (0.493 mol) of acetone in 50 ml of methanol dropwise. Subsequently 52.5 g (0.738 mol) of pyrolidene is added. The reaction mixture is stirred at ambient temperature for 24 hours. After neutralisation with acetic acid and separation of the organic phase the solvent is evaporated and the remaining yellow oil is subjected to distillation. A mixture of 3,6,6-Me3-Ful and 2,6,6-Me3-Ful is obtained in 65% yield.

B. Preparation of 1-Methyl-3-tert-butylcyclopentadiene

Reaction 3,6,6-Me3-Ful + Me-Li $\xrightarrow[0° C.]{\text{Ether}}$ 1-Me-3-t-Bu-Cp Procedure 50 g (0.417 mol) of 3,6,6-Me3-t-Bu-Ful is placed in a 1 liter flask and dissolved in 500 ml of diethyl ether and cooled down to 0° C. To the solution is added dropwise 260.4 ml (0.417 mol) of methyllithium in ether (1.6 mol). The reaction is completed after a few hours. After adding 75 ml of saturated solution of NH4Cl in water, the organic phase is separated and dried with MgSO4. The evaporation of the solvent leads to the isolation of a yellow oil. After distillation, 33.65 g (59.28%) of 1-Me-3-t-Bu-Cp is obtained.

C. Preparation of 1,6,6-Trimethyl-3-tert-butylfulvene

Reaction

1-Me-3-t-Bu-Cp + Acetone $\xrightarrow[\text{Pyrolidene}]{\text{Methanol}}$ 1,6,6-Me3-3-t-Bu-Ful Procedure In a 1 l flask is placed 30 g (0.220 mol) of 1-Me-3-t-Bu-Cp and dissolved in 60 ml of methanol. The mixture is cooled down to −78° C. 5.11 g (0.088 mol) of acetone in 20 ml of methanol is added slowly. In the next step, 9.4 g (0.132 mol) of pyrolidene in 20 ml of methanol is added. After a week, the reaction is terminated by addition of 20 ml of acetic acid. After separation of the organic phase, drying, evaporation of solvents and distillation, 16.95 g of an orange oil is obtained (yield, 43.66%).

D. Preparation of 2,2-[(3-tertButyl-5-methyl-cyclopentadienyl)-(3,6-di-tertbutyl-fluorenyl)]-propane Reaction 3,6-d-t-Bu-Flu + Me-Li $\xrightarrow[0° C.]{\text{THF}}$ (3,6-d-t-Bu-Flu)-Li+

-continued (3,6-d-t-Bu-Flu)-Li+ + 1,6,6-Me3-3-t-Bu-Ful $\xrightarrow{\text{THF}}$ Me2C(3-t-Bu-5-Me-Cp) (3, 6-d-t-Bu-Flu)

Procedure 1.5 g (5.387 mmol) of 3,6-d-t-Bu-Flu in 100 ml of dry tetrahydrofuran, is placed into a 250 ml flask, under N2 and the solution is pre-cooled to 0° C. The 3,6-d-t-Bu-Flu may be synthesised according to Shoji Kajigaeshi et al. Bull. Chem. Soc. Jpn. 59, 97–103 (1986) or M Bruch et al. Liebigs Ann. Chem. 1976, 74–88. Then, a solution of 3.4 ml (5.387 mmol) of methyllithium is added drop wise to the solution. The solution is red and is further continued at room temperature during 4 hours. After that, a solution of 0.9497 g (5.382 mmol) of 1,6,6-Me3-3-t-Bu-Ful in 10 ml of dry tetrahydrofuran is added dropwise to this solution. The reaction is further continued during 24 hours. After adding 40 ml of saturated solution of NH4Cl in water, the yellow organic phase is separated and dried with MgSO4 anhydrous. The evaporation of the solvent leads to the isolation of 2.36 g (yield, 96.32%) of orange solid product.

E. Preparation of Isopropylidene [(3-tertbutyl-5-methyl-cyclopentadienyl)-(3,6-di-tertbutyl-fluorenyl)]zirconium Dichloride (1)

Reaction

Me2C(3-t-Bu-5-Me-Cp) (3, 6-d-t-Bu-Flu) + Me-Li $\xrightarrow[0° C.]{\text{THF}}$ Me2C(3-t-Bu-5-Me-Cp)-Li+(3,6-d-t-Bu-Flu)-Li+

Me2C(3-t-Bu-5-Me-Cp)-Li+(3,6-d-t-Bu-Flu)-Li+ $\xrightarrow[\text{n-C5}]{\text{ZrCl4}}$ Me2C(3-t-Bu-5-Me-Cp) (3, 6-d-t-Bu-Flu)ZrCl2 + 2 LiCl Procedure 2 g (4.398 mmol) of ligand is dissolved in 100 ml of dry tetrahydrofuran under N2, and the solution is pre-cooled to 0° C. A solution of 5.5 ml (8.796 mmol) of methyllithium (1.6 mol/diethyl ether) is added dropwise to this solution. After 3 hours, the solvent is removed in vacuum, the red powder is washed with 2×100 ml of pentane. The red dianion ligand and 100 ml of pentane are placed into a 250 ml flask, under N2. 1.02 g (4.398 mmol) of zirconium tetrachloride is added to this suspension. The reaction mixture is red-brown and stirred overnight in a glove box. After filtration, the orange solution is removed in vacuo at 40° C. and yielded 2.3 g (85.18%) of orange powder. Apparently, this metallocene is soluble in pentane. According the 1HNMR of the product it seems that a second isomer with a chemical structure of isopropylidene (2(or 4)-methyl-3-tertbutylcyclopentadienyl-3,6-ditertbutylfluorenyl)ZrCl2 (2) is formed as the second product which is less stereoregular.

EXAMPLE 2

Preparation of Isopropylidene[(3-methyl-cyclopentadienyl)-(3,6-di-tertbutyl-fluorenyl)] zirconium Dichloride The synthetic procedure according to Example 1 is followed except that the ligand in step D is replaced by the 2,2-[(3-methyl-cyclopentadienyl)-(3,6-di-tertbutyl-fluorenyl)]-propane.

A. Preparation of 2,2-[(3-Methyl-cyclopentadienyl)-(3,6-di-tertbutyl-fluorenyl)]-propane Procedure The preparation of this ligand is the same as that of step D, but the 1,6,6-trimethyl-3-tert-butylfulvene is replaced by 0.6475 g (5.387 mmol) of 3,6,6-trimethylfulvene (the synthetic procedure is described in Example 1, step A).

EXAMPLE 3

Preparation of Isopropylidene[(3-tertbutyl-cyclopentadienyl)-(3,6-di-tertbutyl-fluorenyl)] zirconium Dichloride The synthetic procedure according to Example 1 is followed except that the ligand in step D is replaced by the 2,2-[(3-tertbutyl-cyclopentadienyl)-(3,6-di-tertbutyl-fluorenyl)]-propane prepared as below.

A. Preparation of 2,2-[(3-tertButyl-cyclopentadienyl)-(3,6-di-tertbutyl-fluorenyl)]-propane Procedure The preparation of this ligand is the same that the step D, but the 1,6,6-trimethyl-3-tert-butylfulvene is replaced by 0.8742 g (5.387 mmol) of 6,6-dimethyl-3-tert-butylfulvene.

B. Preparation of 6,6-Dimethyl-3-tert-butylfulvene

Procedure

The synthetic procedure according to Example 1, step A, is followed, but the methylcyclopentadiene is replaced by the tert-butylcyclopentadiene.

C. Preparation of tert-Butylcyclopentadiene

Procedure

The synthetic procedure according to Example 1, step B, is followed, but the 3,6,6-trimethylfulvene is replaced by 6,6-dimethylfulvene.

EXAMPLE 4a

Preparation of Isopropylidene[(3-trimethylsilyl-cyclopentadienyl)-(3,6-di-tertbutyl-fluorenyl)] zirconium Dichloride The synthetic procedure according to Example 1 is followed except that the ligand in step D is replaced by the diphenyl[(3-trimethylsilyl-cyclopentadienyl)-(3,6-di-tertbutyl-fluorenyl)]methylene.

A. Preparation of 2,2-[(3-Trimethylsilyl-cyclopentadienyl)-(3,6-di-tertbutyl-fluorenyl)]propane Procedure The preparation of this ligand is the same as described in Example 1, step D, except that the 1,6,6-trimethyl-3-tert-butylfulvene is replaced by 1.2407 g (5.387 mmol) of 6,6-dimethylfulvene.

B. Preparation of 2,2-[(3-Trimethylsilyl-cyclopentadienyl)-(3,6-di-tertbutyl-fluorenyl)]propane Reaction

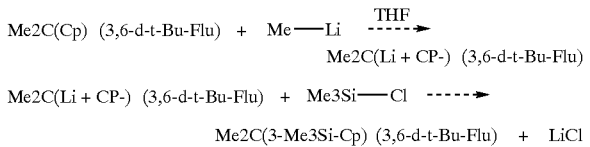

Procedure

First, in a 1 l flask, 10 g (0.026 mol) of 2,2-(cyclopentadienyl)(3,6-di-tertbutyl-fluroenyl)propane is dissolved in 300 ml of tetrahydrofuran under N2. Then 16.25 ml (0.026 mol) of methyllithium is added dropwise to this solution at room temperature (the flask is pre-cooled with a water bath). After a stirring period of one hour, 3.3 ml (0.026 mol) of chlorotrimethylsilane, is added to this solution. The reaction mixture is stirred for an additional 3 hours. Then the solvent is removed in vacuo. One liter of pentane is added to the solid orange residue. the reaction mixture is heated at 40° C. for 10 minutes. The orange solution is filtered (to remove LiCl, 1.40 g of residue), concentrated to 100 ml, and cooled down to crystallise the product 2,2-(3-trimethylsilyl-cyclopentadienyl) fluorenyl)propane. The raw product has a beige colour. The crystallised product has a white colour, 65–70% yield. The product was stored under N2.

EXAMPLE 4b

Preparation of Diphenylmethylidene[(3-trimethylsilyl-cyclopentadienyl)-(3,6-di-tertbutyl-fluorenyl)]zirconium Dichloride The synthetic procedure according to Example 1 is followed except that the ligand in step D is replaced by the diphenyl[(3-trimethylsilyl-cyclopentadienyl)-(3,6-di-tertbutyl-fluorenyl)]methylene.

A. Preparation of 1,1,1,1-Diphenyl[(3-trimethylsilyl-cyclopentadienyl)-(3,6-di-tertbutyl-fluorenyl)]methane Procedure The preparation of this ligand is the same as described in Example 1, step D, except that the 1,6,6-trimethyl-3-tert-butylfulvene is replaced by 1.2407 g (5.387 mmol) of 6,6-dimethylfulvene.

B. Preparation of Diphenyl[(3-trimethylsilyl-cyclopentadienyl)-(3,6-di-tertbutyl-fluorenyl)]methane Reaction

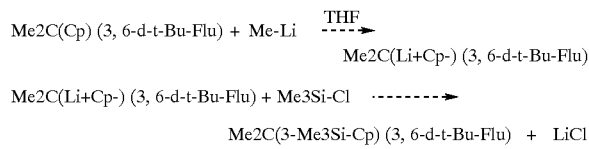

Procedure

First, in a 1 l flask, 10 g (0.026 mol) of 2,2-(cyclopentadienyl)(3,6-di-tertbutyl-fluorenyl)propane is dissolved in 300 ml of tetrahydrofuran under N2. Then 16.25 ml (0.026 mol) of methyllithium is added dropwise to this solution at room temperature (the flask is pre-cooled with a water bath). After a stirring period of one hour, 3.3 ml (0.026 mol) of chlorotrimethylsilane, is added to this solution. The reaction mixture is stirred for an additional 3 hours. Then the solvent is removed in vacuo. One liter of pentane is added to the solid orange residue. the reaction mixture is heated at 40° C. for 10 minutes. The orange solution is filtered (to remove LiCl, 1.40 g of residue), concentrated to 100 ml, and cooled down to crystallise the product 2,2-(3-trimethylsilyl-cyclopentadienyl) (3,6-di-tertbutyl fluorenyl)propane. The raw product has a beige colour. The crystallised product has a white colour, 65–70% yield. The product was stored under N2.

EXAMPLE 5

Preparation of Isopropylidene[(3,5-dimethyl-cyclopentadienyl)-(3,6-di-tertbutyl-fluorenyl)] zirconium Dichloride The synthetic procedure according to Example 1 is followed except that the ligand in step D is replaced by the 2,2-[(3,5-dimethyl-cyclopentadienyl)-(3,6-di-tertbutyl-fluorenyl)]-propane.

A. Preparation of 2,2-[(3,5-Dimethyl-cyclopentadienyl)-(3,6-di-tertbutyl-fluorenyl)]-propane Procedure The preparation of this ligand is the same as in Example 1 step D, but the 1,6,6-trimethyl-3-tert-butylfulvene is replaced by 0.8742 g (5.387 mmol) of 1,3,6,6-tetramethylfulvene.

B. Preparation of 1,3,6,6-Tetramethylfulvene

The synthetic procedure according to Example 1 step A, is followed but the methylcyclopentadiene is replaced by 1,3-dimethylcyclopentadiene.

C. Preparation of 1,3-Dimethylcyclopentadiene

Reaction

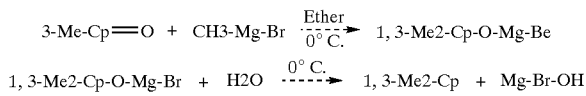

Procedure 195 ml (0.585 mole) of methyl magnesium bromide (solution 3.0 mole/diethyl ether) in 200 ml of dry diethyl ether, is placed into a 2 l flask, under N2 and the solution is pre-cooled to 0° C. Then a solution of 47.15 g (0.4905 mole) of 3-methyl-2-cyclopentenone in 100 ml of diethyl ether is added dropwise to the solution for 3 hours at 0° C. and for an hour at 10° C. This product is transferred into a 5 l flask pre-cooled to 0° C. and containing 1 l of water. The solution is yellow. The yellow organic phase is separated and the solvent is removed in vacuo (500 mbars) at room temperature. The evaporation of the solvent leads to the isolation of a clear orange solution. After distillation 31.83 g (yield, 65.95%) of 1,3-dimethylcyclopentadiene is obtained. The product is a colourless unstable liquid and used directly for the preparation of the 1,3,6,6-trimethylfulvene.

EXAMPLE 6

Preparation of diphenylmethylidene[(3-methyl-cyclopentadienyl)-(3,6-di-tertbutyl-fluorenyl)] zirconium Dichloride The synthetic procedure according to Example 1 is followed except that the ligand in step D is replaced by the 2,2-diphenyl[(3-methyl-cyclopentadienyl)-(3,6-di-tertbutyl-fluorenyl)]propane.

A. Preparation of 1,1,1,1-diphenyl[(3-methyl-cyclopentadienyl)-(3,6-di-tertbutyl-fluorenyl) methane Procedure The preparation of this ligand is the same as described in Example 1, step D, except that the 1,6,6-trimethyl-3-tert-butylfulvene is replaced by 1.2407 g (5.387 mmol) of 3-methyl-6,6-diphenylfulvene.

B. Preparation of 3-Methyl-6,6-diphenylfulvene

Procedure

The preparation of this fulvene is the same as described in Example 1, step A, except that the acetone is replaced by 1.3162 g (5.387 mmol) of 6,6-diphenylfulvene.

EXAMPLE 7

Preparation of Diphenylmethylidene[(3-tertbutyl-cyclopentadienyl)-(3,6-di-tertbutyl-fluorenyl)] zirconium Dichloride The synthetic procedure according to Example 1 is followed except that the ligand in step D is replaced by the diphenyl[(3-terbutyl-cyclopentadienyl)-(3,6-di-tertbutyl-fluorenyl)]methylene.

A. Preparation of 1,1,1,1-Diphenyl[(3-tertbutyl-cyclopentadienyl)-(3,6-di-tertbutyl-fluorenyl)]methane Procedure The preparation of this ligand is the same as described in Example 4, step A, except that the 6,6-dimethyl-3-tert-butylfulvene is replaced by the 3-tertbutyl-6,6-diphenylfulvene.

B. Preparation of 3-TertButyl-6,6-diphenylfulvene

Procedure

The preparation of this fulvene is the same as described in Example 1, step A, except that the acetone is replaced by the benzophenone and the methylcyclopentadiene is replaced by the tert-butylcyclopentadiene (the synthetic procedure is described in Example 4, step C).

EXAMPLE 8

Preparation of Diphenylmethylidene[(3-trimethylsilyl-cyclopentadienyl)-(3,6-di-tertbutyl-fluorenyl)]zirconium Dichloride The synthetic procedure according to Example 1 is followed except that the ligand in step D is replaced by the 2,2-diphenyl[(3-trimethylsilyl-cyclopentadienyl)-(3,6-di-tertbutyl-fluorenyl)]propane A. Preparation of 1,1,1,1-Diphenyl[(3-trimethylsilyl-cyclopentadienyl)-(3,6-di-tertbutyl-fluorenyl)]methane Procedure The preparation of this ligand is the same as described in Example 4, step B, except that the 2,2-[(cyclopentadiene)(fluorenyl)]propane is replaced by the 2,2-diphenyl[(cyclopentadienyl)(fluorenyl)]propane.

B. Preparation of 2,2-Diphenyl[(cyclopentadienyl)-(3,6-di-tertbutyl-fluorenyl)]propane Procedure The preparation of this ligand is the same as described in Example 1, step D, except that the 1,6,6-trimethyl-3-tert-butylfulvene is replaced by the 6,6-diphenylfulvene.

EXAMPLE 9

Polymerisation Procedures

Each polymerisation was performed in a 4 liter bench reactor with pure propylene. Polymerisation was initiated by introducing metallocene (0.5 to 5 mg) precontacted with 1 ml of MAO (methylaluminoxane) (30% solution in toluene obtained from WITCO) three minutes prior to its introduction into the reactor.

Table 1 shows the microtacticity of the polymer obtained using the catalyst according to Example 1 under polymerisation conditions as defined above. The results were obtained using $^{13}C$ NMR spectroscopy. It will be apparent that the polypropylene contained more than 95% of pentads in the purely isotactic form (mmmm). The molecular weight (Mw) of the polypropylene was 530,000 and the melting point was 153° C. Melting point was determined by DSC analysis as shown in FIG. 13. A sample was held at 25° C. for 1 min, heated from 25° C. to 220° C. at 20° C./min and held for 5 mins at 220° C. The sample was then cooled from 220° C. to 25° C. at 20° C./min, held at 25° C. for 3 mins and heated from 25° C. to 220° C. at 20° C./min.

TABLE 1

Pentad stereo-sequence distributions %

| | |
|---|---|
| mmmm | 95.7 |
| mmmr | 1.70 |
| rmmr | 0.00 |
| mmrr | 1.70 |
| mmrm + rmrr | 0.00 |
| mrmr | 0.00 |
| rrrr | 0.00 |
| mrrr | 0.00 |
| mrrm | 0.80 |

TABLE 2

| Run | T Pol ° C. | Hydrogen | MI2 | Activity | T (melt) | T (recry) | Mn | Mw | Mz | D | mmmm % |
|---|---|---|---|---|---|---|---|---|---|---|---|
| 1 | 60° C. | 0 NI. | | 11,299 | 160.5 | 110.9 | 140,620 | 450,834 | 971,692 | 3.2 | 96.23 |
| 2 | 60° C. | 0 NI. | | 4,889 | 156.8 | 115.6 | 152,183 | 576,644 | 1,238,131 | 3.8 | 95.15 |
| 3 | 60° C. | 0 NI. | 0.5 | 15,772 | 161.4 | 114.0 | 151,062 | 515,399 | 1,092,618 | 3.4 | 96.07 |
| 4 | 80° C. | 0 NI. | | 21,859 | 155.7 | 102.7 | 90,958 | 215,031 | 417,006 | 2.4 | 94.18 |
| 5 | 60° C. | 0 NI. | | 24,115 | 159.5 | 112.9 | 177,211 | 637,977 | 1,344,283 | 3.6 | 96.16 |
| 6 | 80° C. | 0 NI. | 1.9 | 41,546 | 154.9 | 106.9 | 119,201 | 286,072 | 568,665 | 2.4 | 95.17 |
| 7 | 40° C. | 0 NI. | | 1,177 | 157.2 | 112.2 | 186,032 | 1,363,315 | 3,506,808 | 7.3 | 97.30 |
| 8 | 60° C. | 1 NI. | 14.7 | 36,530 | 161.7 | 116.1 | 64,952 | 199,020 | 727,048 | 3.1 | 97.10 |
| 9 | 60° C. | 2 NI. | 158.0 | 25,659 | 160.5 | 116.5 | 35,877 | 94,120 | 174,790 | 2.6 | 97.50 |

After Xylene Extraction:

| Run | T Pol ° C. | Hydrogen | % Xylene soluble | Mn | Mw | Mz | D | mmmm % |
|---|---|---|---|---|---|---|---|---|
| 1 | 60° C. | 0 NI. | 0.58 | 119,675 | 425,468 | 1,004,487 | 3.6 | 95.3 |
| 3 | 60° C. | 0 NI. | 0.60 | 143,213 | 464,465 | 1,032,093 | 3.2 | 94.6 |
| 8 | 60° C. | 1 NI. | 0.14 | 69,301 | 204,803 | 447,736 | 3.0 | 97.0 |

Table 2 of the production of isotactic polypropylene using according to Example 1 under the polymerization conditions defined above. MI2 refers to melting point index; N1 refers to normal liters; and Activity refers to gram of polypropylene per gram of catalyst per hour. It will be apparent that the isotactic propylene produced contained in some cases over 97% of pentads in the purely isotactic form (mmmm). High weight average molecular weights were obtained at 40° C. and 60° C., particularly in the absence of added hydrogen. A polymerization temperature of around 60° C. was found to be particularly useful because relatively high molecular weights and high catalyst activity were obtained in combination with good microtacticity.

What is claimed is:

1. A process for preparing polyolefins having a monomer length of up to C10, which comprises
   a) contacting:
       (1) a metallocene catalyst component for the preparation of a polyolefin which comprises an isotactic polyolefin or syndiotactic/isotactic block polyolefin having a monomer length of up to C10, the component having the general formula:

R"(CpR$_1$R$_2$R$_3$)(Cp'R$_1$'R$_2$')MQ$_2$ wherein Cp is a cyclopentadienyl ring substituted with at least one substituent of R$_1$, R$_2$ and/or R$_3$; Cp' is a substituted fluorenyl ring with substituents R$_1$' and R$_2$'; R" is a structural bridge imparting stereorigidity to the component; R$_1$ is a substituent on the cyclopentadienyl ring which is distal to the bridge, which distal substituent comprises a bulky group of the formula XR*$_3$ in which X is chosen from Group IVA, and each R* is the same or different and chosen from hydrogen or hydrocarbyl of from 1 to 20 carbon atoms, R$_2$ is a substituent on the cyclopentadienyl ring which is proximal to the bridge and positioned non-vicinal to the distal substituent and is of the formula YR#$_3$ in which Y is chosen from group IVA, and each R# is the same or different and chosen from hydrogen or hydrocarbyl of 1 to 7 carbon atoms; R$_3$ is a substituent on the cyclopentadienyl ring which is proximal to the bridge and is a hydrogen atom or is of the formula ZR$$_3$, in which Z is chosen from group IVA, and each R$ is the same or different and chosen from hydrogen or hydrocarbyl of 1 to 7 carbon atoms; R$_1$' and R$_2$' are each independently substituent groups at positions 3 and 6 on the fluorenyl ring, respectively, one of which is a group of the formula AR'"$_3$, in which A is chosen from Group IVA, and each R'" is independently hydrogen or a hydrocarbyl having 1 to 20 carbon atoms and the other is hydrogen or a second group of the formula AR'"$_3$; M is a Group IVB transition metal or vanadium; and each Q is hydrocarbyl having 1 to 20 carbon atoms or is a halogen, and
       (2) an aluminum- or boron-containing co-catalyst capable of activating the catalyst component; and
   b) contacting the activated catalyst with at least one olefin in a reaction zone under polymerization conditions to form an isotactic polyolefin or a syndiotactic/isotactic block polyolefin.

2. A process according to claim 1, wherein A is carbon or silicon.

3. A process according to claim 2, wherein R'"$_3$ is hydrocarbyl having from 1 to 20 carbon atoms.

4. A process according to claim 3, wherein R'"$_3$ is C(CH$_3$)$_3$.

5. A process according to claim 1, wherein AR'"$_3$ is Si(CH$_3$)$_3$.

6. A process according to claim 1, wherein R$_1$' and R$_2$' are the same.

7. A process according to claim 1, wherein R" is alkylidene having 1 to 20 carbon atoms, a dialkyl germanium or silicon or siloxane, alkyl phosphine or amine.

8. A process according to claim 7, wherein R" is isopropylidene, dimethylsilanediyl or diphenylmethylidene.

9. A process according to claim 1, wherein M is zirconium or titanium.

10. A process according to claim 1, wherein Q is halogen.

11. A process according to claim 1, wherein R$_1$ is (CH$_3$)$_3$, C(CH$_3$)$_2$Ph, CPh$_3$ or Si(CH$_3$)$_3$.

12. A process according to claim 11, wherein R$_1$ is C(CH$_3$)$_3$.

13. A process according to claim 1, wherein Y is carbon.
14. A process according to claim 1, wherein Z is carbon.
15. A process according to claim 1, wherein $R_2$ is $CH_3$.
16. A process according to claim 1, wherein $R_3$ is $CH_3$.
17. A process according to claim 1, wherein the metallocene catalyst component comprises isopropylidene-3-t-butyl-5-methyl-cyclopentadienyl 3,6 di-t-butyl fluorenyl $ZrCl_2$.
18. A process for preparing polyolefins having a monomer length of up to C10, which comprises
   a) contacting:
      (1) a metallocene catalyst component for the preparation of a polyolefin which comprises an isotactic polyolefin or syndiotactic/isotactic block polyolefin having a monomer length of up to C10, the component having the general formula:

$$R"(CpR_1R_2R_3)(Cp'R_1'R_2')MQ_2$$

wherein Cp is a cyclopentadienyl ring substituted with at least one substituent of $R_1$, $R_2$ and/or $R_3$; Cp' is a substituted fluorenyl ring with substituents $R_1'$ and $R_2'$, R" is a structural bridge imparting stereorigidity to the component; $R_1$ is a substituent on the cyclopentadienyl ring which is distal to the bridge, which distal substituent comprises a bulky group of the formula $XR^*_3$ in which X is chosen from Group IVA, and each $R^*$ is the same or different and chosen from hydrogen or hydrocarbyl of from 1 to 20 carbon atoms. $R_2$ is a substituent on the cyclopentadienyl ring which is proximal to the bridge and positioned vicinal to the distal substituent and is of the formula $YR\#_3$ in which Y is chosen from group IVA, and each R# is the same or different and chosen from hydrogen or hydrocarbyl of 1 to 7 carbon atoms; $R_3$ is a substituent on the cyclopentadienyl ring which is proximal to the bridge and is a hydrogen atom or is of the formula $ZR\$_3$, in which Z is chosen from group IVA, and each R$ is the same or different and chosen from hydrogen or hydrocarbyl of 1 to 7 carbon atoms; $R_1'$ and $R_2'$ are each independently substituent groups at positions 3 and 6 on the fluorenyl ring, respectively, one of which is a group of the formula $AR'''_3$, in which A is chosen from Group IVA, and each R''' is independently hydrogen or a hydrocarbyl having 1 to 20 carbon atoms and the other is hydrogen or a second group of the formula $AR'''_3$; M is a Group IVB transition metal or vanadium; and each Q is hydrocarbyl having 1 to 20 carbon atoms or is a halogen, and
      (2) an aluminum- or boron-containing co-catalyst capable of activating the catalyst component; and
   b) contacting the activated catalyst with at least one olefin in a reaction zone under polymerization conditions to form an isotactic polyolefin or a syndiotactic/isotactic block polyolefin.
19. A process according to claim 18, wherein the metallocene catalyst component comprises isopropylidene-(3-t-butyl-2-methyl cyclopentadienyl-3,6 di-t-butylfluorenyl) $ZrCl_2$.
20. A process according to claim 1, wherein the catalyst system further comprises an inert support.
21. A process according to claim 1, wherein $R_1$ is a substituent on the cyclopentadienyl ring and the polyolefin is a syndiotactic/isotactic block polyolefin.
22. A process according to claim 1, wherein $R_1$ and $R_2$ are both substituents on the cyclopentadienyl ring and the polyolefin is an isotactic polyolefin.
23. A process according to claim 18, wherein the polyolefin comprises an isotactic polyolefin having a multimodal molecular weight distribution.
24. A process according to claim 1, wherein the olefin is propylene.
25. A process according to claim 1, wherein two or more olefins are present in the reaction zone to produce a polyolefin copolymer.

* * * * *